United States Patent [19]

Fujita et al.

[11] 4,214,250
[45] Jul. 22, 1980

[54] INDICATING RECORDER

[75] Inventors: Hisaya Fujita; Hiroshi Ando; Setsuo Sato, all of Musashino, Japan

[73] Assignee: Yokogawa Electric Works, Ltd., Tokyo, Japan

[21] Appl. No.: 952,151

[22] Filed: Oct. 17, 1978

[30] Foreign Application Priority Data

Nov. 14, 1977 [JP] Japan .................................. 52-136417

[51] Int. Cl.² ........................................... G01D 15/00
[52] U.S. Cl. .................................................... 346/145
[58] Field of Search ........................................ 346/145

[56] References Cited

U.S. PATENT DOCUMENTS

| 2,719,293 | 9/1955 | Hornbruch et al. | 346/145 |
| 4,091,389 | 5/1978 | Fujita et al. | 346/145 X |

Primary Examiner—George H. Miller, Jr.
Attorney, Agent, or Firm—Parmelee, Johnson, Bollinger & Bramblett

[57] ABSTRACT

An indicating recorder comprising a housing unit, an internal frame unit and an electric power source unit. The housing unit includes a single-swing front door and is made from a square prismatic housing formed by bending a thin plate. The internal frame unit is positioned in the vicinity of the inlet of the housing unit and is rotatable in a direction opposite the front door so as to be drawn out toward the front. The internal frame unit has left and right side plates and coupling beams between the two side plates, and principally comprises an indicating recorder mechanism having a chart feed mechanism, a recording pen mechanism, and other related instruments.

The electric power source unit is located in the housing unit and is equipped with a power transformer and a terminal board unit, both of which are in a rear frame region to provide power supply and input signals. The wiring for the terminal board and the power transformer is run along a transverse frame and connected to the internal frame unit by a flexible zigzag wire holder.

7 Claims, 22 Drawing Figures

INDICATING RECORDER

BACKGROUND OF THE INVENTION

With recent progress in computer technology, there has been a trend to produce digital electrical measuring instruments and other general industrial instruments. The world-wide development of the petroleum industry has increased the number of plants and has resulted in an increase in the required panel instrumentation in a typical central control room. This has increased the need for small-sized instruments such as vertical type recorders. The trend of miniaturizing the instrument structure has been further stimulated by the development of a novel circuit known as large scale integration.

It seems that recorders in the next generation will require both digitization and miniaturization. However, analog instruments, unlike digital equipment, are equipped with an outstanding feature that makes it possible to directly observe variations in values to be measured and the conditions of the object being controlled. Because this feature is quite useful in large-sized recorders having a large recording width, a demand for such instruments is still expected.

There is no established specific dividing line between large size and small size recorders. However, any recorder having an effective recording width greater than 150 millimeters is generally referred to as being a large size recorder.

SUMMARY OF THE INVENTION

The present invention relates to large-sized recorders. Its principal object is to provide an improved instrument which is solid and durable but yet convenient to use, maintain and inspect.

An embodiment of the present invention comprises a housing unit enclosing an instrument therein, an electric power source unit comprising a power supply system, and an internal frame unit having component parts and capable of being selectively removed from the housing unit. The housing unit includes elements of thin metallic plates which are easily produced by press work and are coupled with one another, the principal portions thereof being reinforced.

The component parts of the internal mechanisms are divided into two groups, one group including a power transformer having a low failure rate and being heavy in weight, the other group including all of the remaining internal components. The transformer is part of the electric power source unit while the other internal components are in the internal frame unit.

Because the housing is made of thin metallic plates, it can be manufactured at low cost. Reinforcing the structure of the housing in certain areas results in a strong durable structure. Furthermore, it is not necessary to disassemble the recorder to gain access to the internal frame unit because the internal frame unit can be drawn out of the housing unit independently of the heavy electric power source unit. Thus, the recorder can be efficiently designed to minimize frequency of failure.

Another industry developing along with the aforementioned petroleum industry is directed to the molding of aluminum architectural materials. An aluminum molding is produced by pre-heating a columnar aluminum material to a known temperature and extruding the material onto a conveyor belt through a superhard metallic mold referred to as a die. The molding thus obtained is long, and can be cut in desired lengths and applied to various products. The cut surfaces of the molding are different in shape either laterally or vertically.

The present invention is characterized by the skillful use of such shapes for the housing, frame members and gear case of the instrument. Since the shape is produced through the above-described molding step, it is difficult to form a circular hole. However, an open slit having an $\Omega$-like cross section can easily be formed. A screw lock system is provided by applying a self-tapping screw directly to this slit.

Moreover a recessed notch, if formed, serves as a groove for positioning and mounting a component part thereon and can further serve as a duct for housing wires. Thus, the use of such shapes in the embodiment of the present invention renders it possible to implement an improved instrument which can easily be assembled in less manufacturing steps than was previously possible.

In addition to the above, because the shape is a long material of fixed cross-sectional form, it can be used as the transverse member of the internal frame (and other components) in instruments of different recording widths merely by changing the cutting length. Thus, the shape has a multi-purpose application and its use is not limited to any specific kind of instrument or any specific dimensions.

According to the present invention, mass production techniques can be used to provide instruments at a low manufacturing cost. Also, because the shapes used in the preferred embodiment are made of aluminum, no permanent deformation occurs with the passage of time as seen in synthetic resin. Thus, any fault or deterioration of the instrument accuracy which might be caused by such deformation is eliminated. The overall weight of the instrument is low because it is made from aluminum.

Other characteristics of the present invention and its functional effects will be disclosed in the following detailed description.

BRIEF DESCRIPTION OF THE DRAWINGS

FIG. 3 is an exploded view of a housing unit;

FIGS. 6 through 22 illustrate an internal frame unit, in which:

FIG. 6 is a general perspective view of the entire frame unit;

FIG. 7 shows the structure of the frame unit partially exploded;

FIG. 8 is an exploded view of the upper part of the frame unit;

FIG. 9 is a vertical sectional view showing a recording chart holder;

FIG. 10 illustrates the operation of the chart holder;

FIG. 11 is an external view showing a dot printing mechanism;

FIG. 12 is a side view of the dot printing mechanism;

FIG. 13 is a front view of the dot printing mechanism;

FIG. 14 is a top plan view of the dot printing mechanism;

FIG. 15 is a top sectional view of the dot printing mechanism;

FIG. 16 is a side view showing a principal part of the dot printing mechanism;

FIG. 17 is an exploded perspective view showing a balancing motor;

FIG. 18 is an external view of a recording pen mechanism;

FIG. 19 is an exploded perspective view showing the structure of an alarm mechanism;

FIG. 20 is an exploded view of part of a drive mechanism;

FIG. 21 is an exploded view showing another part of the drive mechanism of FIG. 20 and a changeover mechanism; and FIG. 22 is a diagram of the drive mechanism of FIGS. 20 and 21.

DETAILED DESCRIPTION OF THE PREFERRED EMBODIMENTS

I. Housing Unit HU

Figure 1:
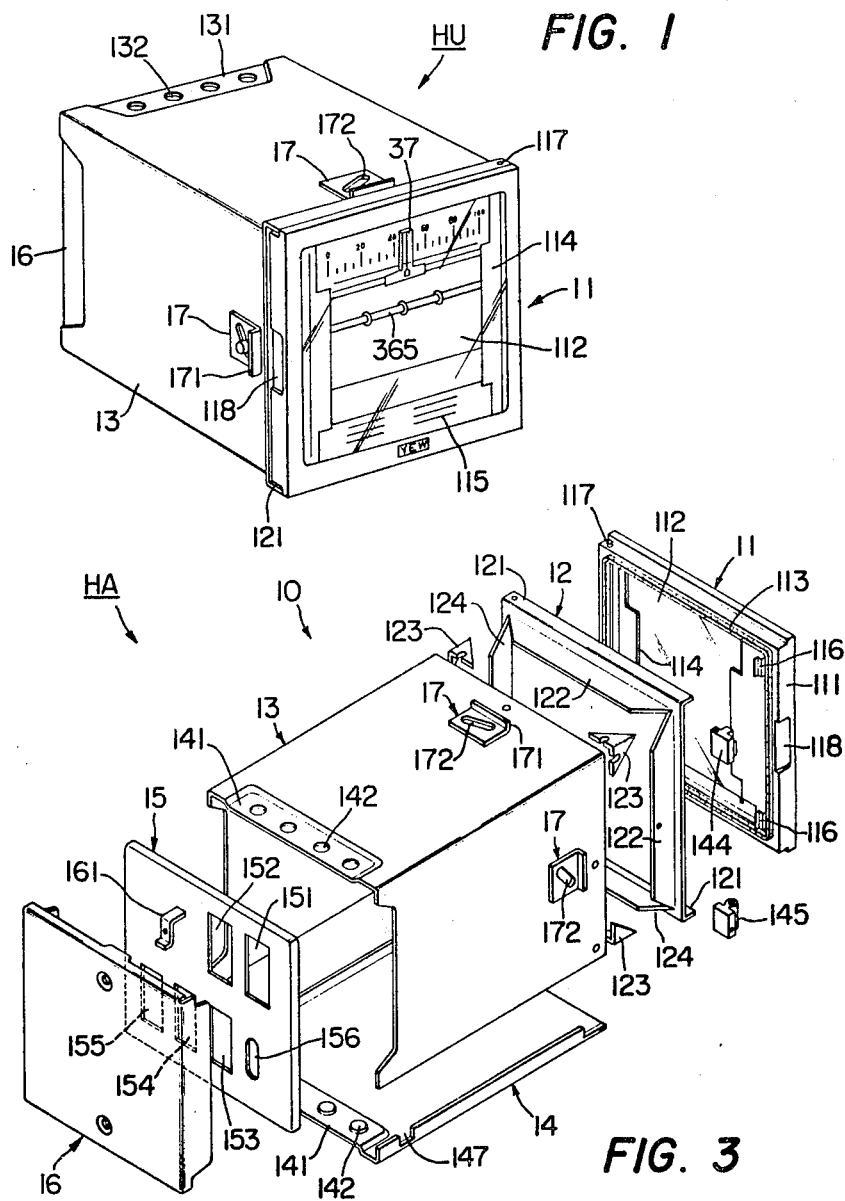
FIG. 1 is a perspective view of an instrument embodying the present invention.
Figure 2:
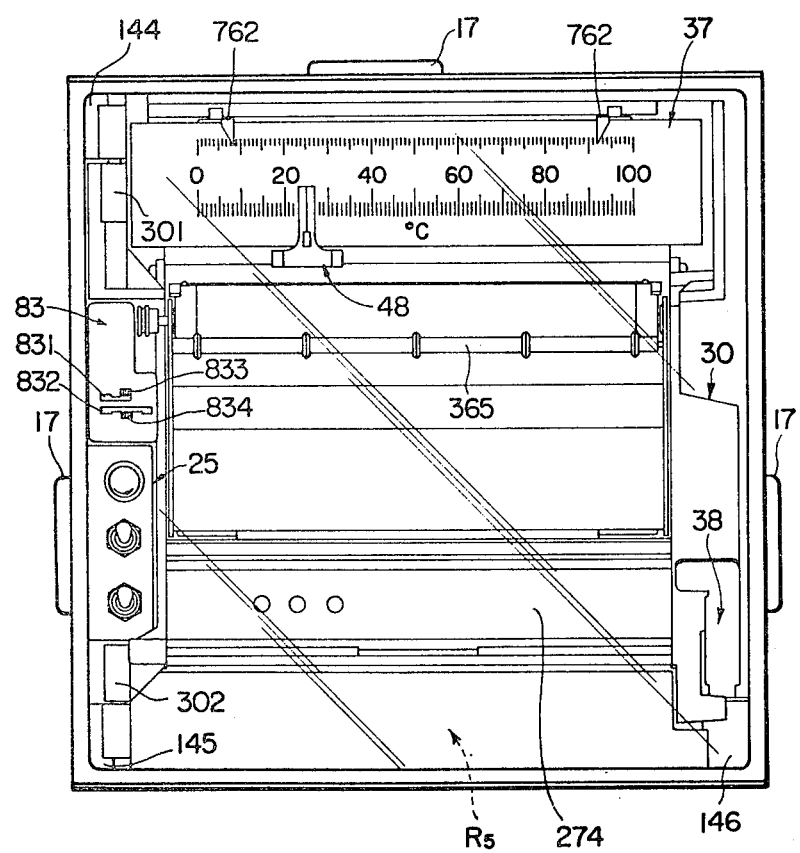
FIG. 2 is a front elevation view of the instrument of FIG. 1 with its door removed.

FIGS. 1 and 2 show a housing unit HU of an embodiment of the new instrument. As illustrated in an exploded view of FIG. 3, the housing unit HU includes a front door 11, a front frame 12, a shell 13, a bottom plate 14, an intermediate plate 15 and a back plate 16. A transparent window 112 is fitted in the door 11 in a die-cast square frame 111, the back of which is equipped with a packing 113, a style strip 114 and a recording card 115. A leaf spring 116 is provided for locking the door 11. The packing 113 reduces the impact when the door 11 is closed, and also seals the instrument to prevent dust or the like from entering. It is further utilized as an air-purging block means.

The apparatus includes a door support pin 117, and a handle 118 is formed by a recess on one side of the frame 111. An L-shaped flange 121 is formed at the upper and lower regions of the front frame 12. The back of the frame 12 has its four corners cut off, and each side 122 is bent towards the rear of the instrument. A reinforcing plate 123, used to fill each cut-off portion 124, is formed by bending a triangular plate at right angles along a perpendicular line. The front frame 12 is easily bendable by press work as its corners are cut off.

Embossed parts 131 and 141, formed in the rear of a shell 13 and a bottom plate 14, have four protruding circular portions 132 and 142, which can easily be punched by applying force from outside of the embossed parts. The circular portions 132 and 142 protrude into the instrument, and external wiring can be sheathed in a hermetic structure by perforating these circular portions with conduit. The number of these circular portions is determined in accordance with the external wiring requirements of the instrument.

Holes 151-156 are formed on an intermediate plate 15 to accommodate terminal boards installed on the plate. The hole 156 is provided for a power-supply terminal board; the holes 151 and 152 are provided for input terminal boards; and the holes 153 through 155 are provided for control signal and transmission signal terminal boards.

A metallic fitting member 161 is attached firmly to the upper inner wall of the shell 13, and a similar member also is provided on the upper surface of the bottom plate 14 for mounting the back plate 16.

Figure 7:
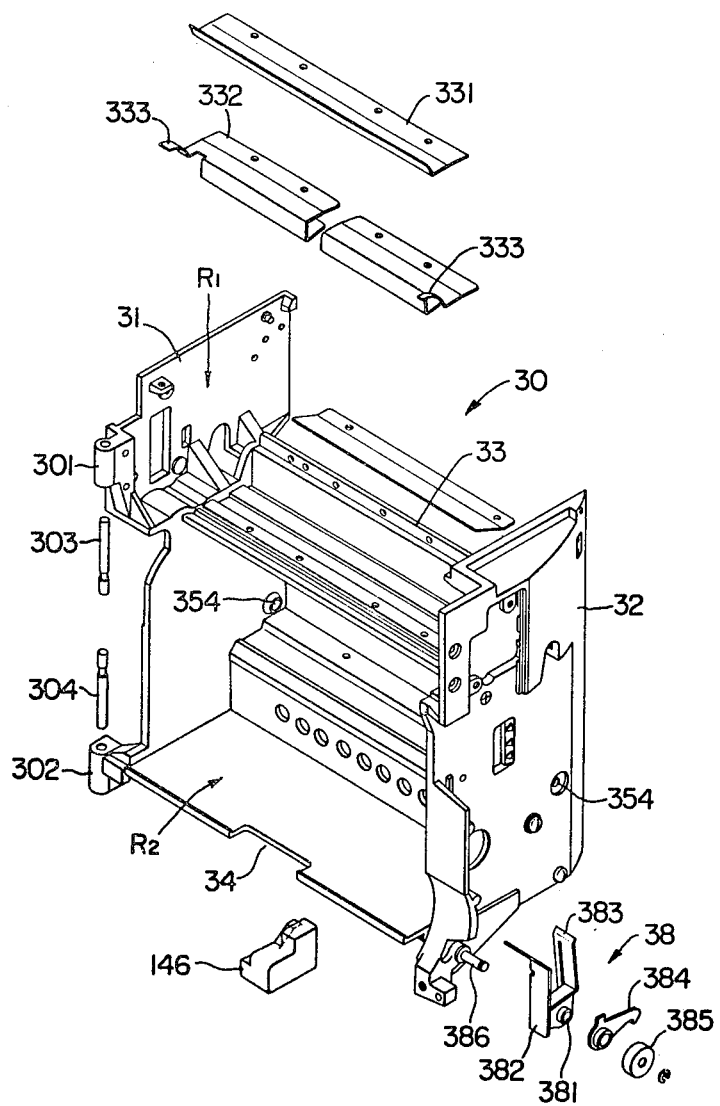

In the above described housing unit HU, the front frame 12, shell 13, bottom plate 14, intermediate plate 15 and back plate 16 are made in the illustrated shapes from plates by press work. The front frame 12, shell 13, bottom plate 14 and intermediate plate 15 are joined into a single body by spot welding. Subsequently, reinforcing plates 123 are inserted into the cut-off corners 124 of front frame 12, and block-like support pieces 144 and 145 are attached to the left sides of the upper and lower regions of the front frame (FIGS. 2 and 3). Similarly, an equivalent lock piece 146 is attached to the lower corner on the right side (FIGS. 2 and 7).

Thus, in the housing body 10, the front frame 12 is reinforced in its front where reinforcing plates 123 are embedded at the four cut corners, and the front frame is further reinforced by the block-like support pieces 144, 145 and the lock piece 146 attached thereon. Thus, the front frame will not readily be deformed by external forces applied thereto. Moreover, the intermediate plate 15 is securely held in place by the embossed portions 131, 141 and the notch 147 of the bottom plate 14. The entire housing unit HU thus is rendered structurally sound.

In the assembled housing body 10, the lower support pin of the door 11 is inserted into a hole in the lower flange 121, and the upper support pin 117 is inserted into a hole on the upper flange to attach the door to the housing body 10. After insertion of the instrument into a panel, the distance between a flange 171 of a fitting member 17 (see FIG. 1) and the flange 121 is reduced so that the instrument can be mounted firmly on the panel (as by means of an inclined slit 172) regardless of the thickness of the panel.

The component parts constituting the instrument are housed entirely in the housing unit HU. Such component parts are classified into a stationary group and a movable group, depending upon where they are positioned. Those components having a low failure rate and being heavy in weight, such as a power transformer, are included in the stationary group and are located within the innermost portion of the housing unit HU. The movable group of component parts includes an indicating mechanism, a recording mechanism, and other components which must be readily accessible to the user for replenishment or replacement of charts and ink, or for inspection or adjustment. This latter part is attached to the internal frame which will be described hereinafter.

In the above manner, the present preferred embodiment provides a design by which the weight applied to the internal frame is small, and components of the instrument are conveniently and easily accessible for maintenance or inspection.

Although the housing unit HU is shown as being rectangularly shaped in FIG. 3, it can be of any prismatic form. In this respect, the word prismatic is intended to mean a polyhedron with two faces that are polygons in parallel planes, the other faces being parallelograms. Prismatic, as used herein, is additionally intended to refer to a shape which resembles a prism.

The stationary group of component parts, including an electric power source, will now be described with reference to FIGS. 4 and 5.

II. Electric Power Source Unit EU

Figure 4:
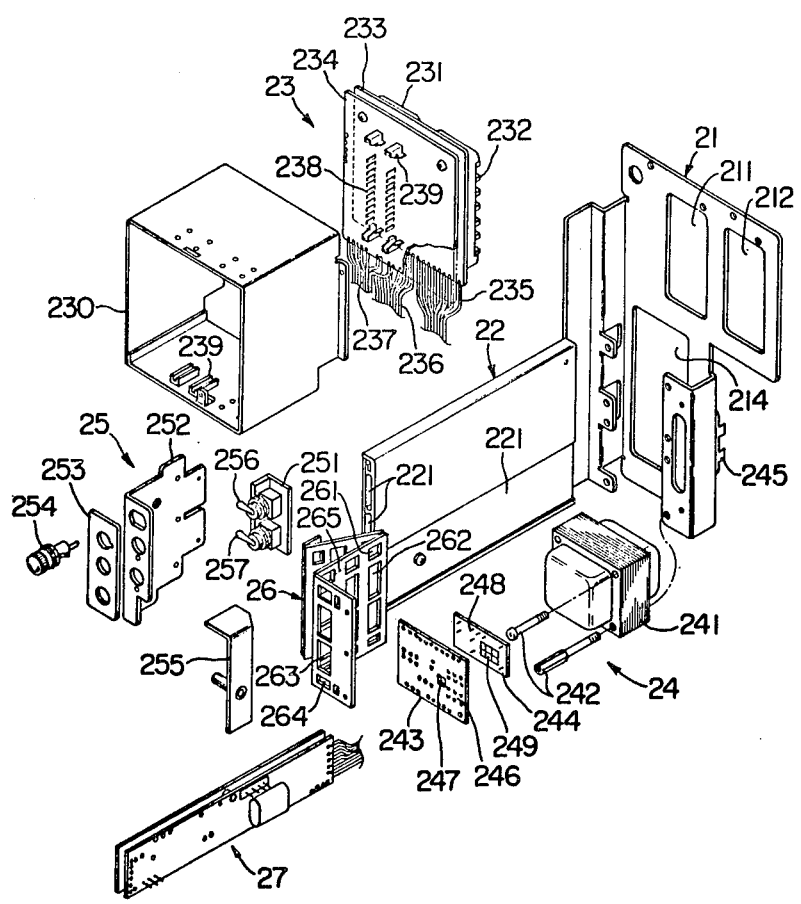
FIG. 4 is an exploded view of an electric power source unit.
Figure 5:
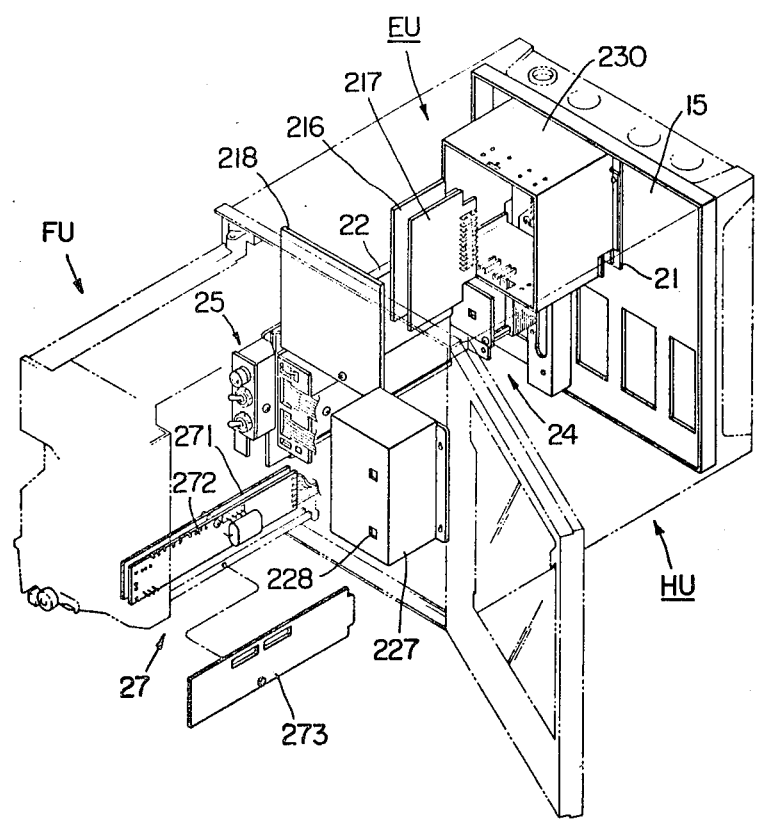
FIG. 5 is a perspective view showing a portion of the electric power source unit of FIG. 4 installed in the housing unit.

Referring to FIGS. 4 and 5, an electric power source unit EU includes wiring and a terminal board for a 100-volt commercial power supply; wiring and a terminal board for a measured-value signal transmitted from each of several measuring points; a power transformer for providing power to drive the electronic components; and printed-circuit boards of, for example, amplifier circuits and range circuits.

A rear frame of the electric power source unit EU is shown by numeral 21, and a transverse frame connected to the rear frame is shown at 22. The rear frame 21 is made of a bent metallic plate and has holes 211–214 on its back surface. (The hole 213, which is oval and smaller than others, is not shown). The holes 211, 212 and 213 are formed opposite to holes 151, 152, 156 on the intermediate plate 15. The hole 214 is an idle hole provided for handling and manufacturing convenience.

A terminal board mechanism 23 is used for input signals. Elements 231 and 232 are terminal boards, and elements 233 and 234 are two printed-circuit boards parallel to each other. The terminal board 231 covers measuring points Numbers 1 through 6, while the terminal board 232 covers measuring points Numbers 7 through 12. Input signal leadwires are individually connected to the terminal boards.

Although not shown, groups of terminal pieces are arrayed on the reverse sides of the terminal boards 231, 232 and are coupled to + and − screw terminals located on the obverse sides. These terminal pieces are inserted into the holes of printed-circuit board 233 and are fixed thereto by direct soldering. Flexible wires 235, 236 and 237 are connected to the printed-circuit boards 231 and 232, which are directly coupled to each other.

The apparatus includes a connector pin 238 and a guide 239 for the printed-circuit board. After assembly of the terminal board mechanism 23, as illustrated, it is attached to the rear frame 21 by screws, and a cover 230 is mounted thereon. Two printed-circuit boards 216 and 217, having an amplifier circuit and a range circuit, are inserted into the cover 230 as shown in FIG. 5 by the use of the guide 239. These circuit-boards 216 and 217 serve as slave printed-circuit boards and are connected to a master printed-circuit board 234 by the connector pin 238. A lid 218 is mounted on the cover 230.

A transformer mechanism 24 includes a power transformer 241, four set-screws 242, and main and auxiliary printed-circuit boards 243, 244, respectively. The transformer 241 is affixed to the lower portion of the rear frame 21 by screws 242. Of these four set-screws, two are slightly longer than others to form studs, and the main printed-circuit board 243 is supported by the ends thereof.

The main printed-circuit board 243 has a window 247 and a conduction pattern including a group of pin holes 246 which are arrayed at fixed horizontal and vertical intervals. Pins 248, which are in alignment with some of the pin holes 246, are affixed to the auxiliary printed-circuit board 244. This auxiliary circuit board is equipped with a frame 249 where the values of supply voltages (e.g. 100 V, 112 V, 120 V, 200 V, 220 V, 240 V) are individually displayed on various square screens.

Each square of the frame 249 is of equal dimension to that of the window 247. By selecting a value for a desired supply voltage within the frame 249, (e.g. "100" for 100 volts) and fitting the pin 248 into the pin hole 246 while superposing the auxiliary printed-circuit board 244 on the main printed-circuit board 243 in a manner that the selected valve is displayed in the window 247, the wiring connection to obtain the displayed supply voltage is automatically obtained. For example, if the desired supply voltage is 120 volts, it is obtained by superposing the auxiliary printed-circuit board 244 on the main printed-circuit board 243 to display "120" in the window 247. In any event, the same voltage can be attained from the respective terminals of the secondary winding of printed-circuit board 243.

Thus, a single transformer can be used to provide supply voltages, and the proper electrical connections can easily be made. The voltage can conveniently be checked by glancing at the valve displayed in the window 247. A cover 227 for the transformer has a window 228 in alignment with the window 247.

The transverse frame 22, which was described above, is disposed along one side of the housing unit HU. Recesses 221, which are defined on the two sides of the transverse frame 22, receive the power supply leadwires and signal leadwires in the electric power source unit EU. These leadwires are separated in accordance with their associated levels and functions, thereby providing neat wiring. The recesses further serve as ducts to prevent harmful effects of noise or the like generated among the different wires.

A switch mechanism 25 comprises a switch 251 having two sets of transfer contacts, a chassis 252, a display plate 253, a replaceable fuse 254 and a cover plate 255, all of which are assembled within a single unit. A knob 256 is used to control the recording, while a knob 257 located below the knob 256 is used to control the power supply. Each knob is turned on when pressed up, and is turned off when pressed down.

A wiring holder is shown by numeral 26, and printed-circuit board mechanism having two printed-circuit boards 271 and 272 is shown by numeral 27. The holder 26 is made of a plate of synthetic resin such as vinyl chloride or polypropylene. The plate has grooves which are spaced apart at predetermined intervals on the alternate surfaces of the plate. The plate is bent along the grooves to form a zigzag configuration.

Longitudinally extending insertion holes 261 through 264 are formed in the holder 26, and a cut line 265 connects these insertion holes. Power supply wires and signal wires 235, 236, 237 and so forth, which connect the power terminal board 245 via the switch mechanism 25 to the transformer mechanism 24, are inserted into the holes 261 through 264. The insertion of the wires into the holes is accomplished by first extending the desired wire along one surface of the holder 26, and then pushing out the cut line 265 to the opposite side together with the wire, to shift the pushed portion of the wire to the other side of the holder 26. The result is that the wire is inserted through the holes while changing its direction alternately and is held like a sewing thread in the holder 26.

When replacing the inserted wire from the holder, the above described insertion procedure is reversed. Thus, using the cut line 265 of holder 26 eliminates the necessity of individually inserting the wire through each of the insertion holes 261–264 of holder 26, thus providing ease in performing the wiring.

The leadwire 237 is connected to the control printed-circuit board mechanism 27 which is equipped with variable resistors partially comprising a gain control circuit and zero-span adjusting circuits. The mechanism 27 is located in the lower room R3 of internal frame unit FU so that the control elements of the variable resistors are exposed and can be adjustable from the front of the instrument.

Figure 6:
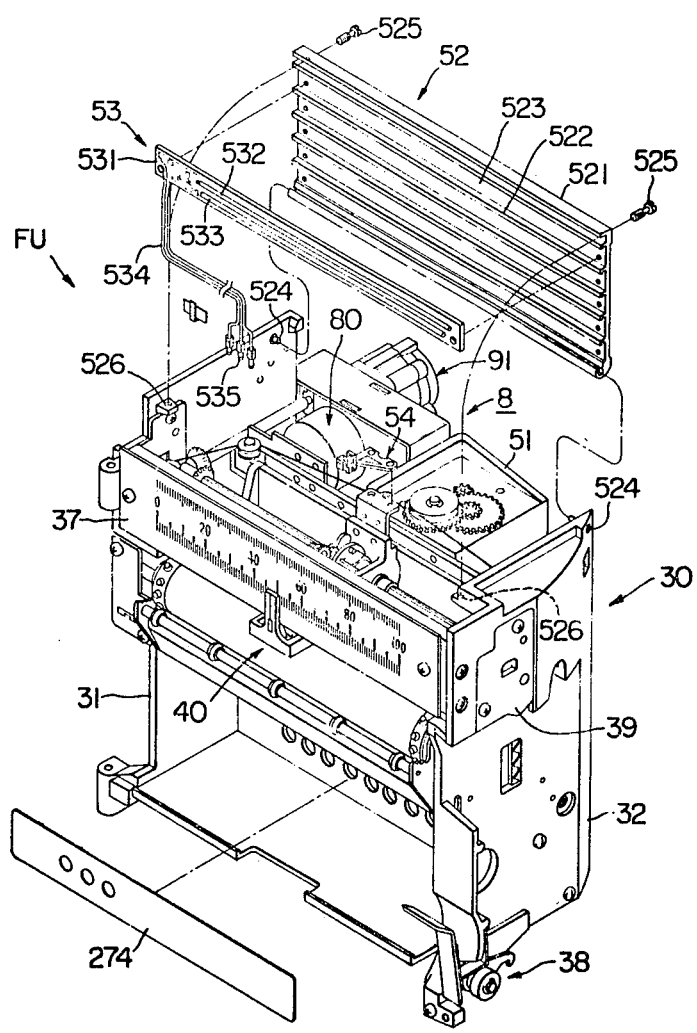

A back lid for the mechanism 27 is shown at 273, and a style strip where GAIN, ZERO AND SPAN to be adjusted are so written is shown in 274 (See FIGS. 2 and 6). The terminal board mechanism 23, transformer mechanism 24, switch mechanism 25, wire holder 26 and control printed-circuit board mechanism 27 are mounted integrally on the rear and transverse frames 21 and 22, respectively, to complete the electric power source unit EU.

The electric power source unit is inserted into the housing unit HU from its front and is attached thereto by several screws. Subsequently, the other end of wire holder 26 is anchored to the internal frame unit FU, and the control printed-circuit board mechanism 27 is set at a predetermined position to complete the assembly. When the terminal boards 231, 232 and 245 are attached to the rear frame 21, the respective screw-terminal sides are exposed to the reverse side through the holes 152, 153 and 151 of the intermediate plate 15.

The electric power source unit EU thus set is connected to the movable internal frame unit FU by wires, which are coupled through the holder 26. The wires are closely folded in a zigzag pattern together with the holder 26 when the frame unit FU is encased in the housing unit HU. These wires are extended laterally when the frame unit FU is drawn out. Thus, the slack wires neither droop down nor protrude laterally, thereby providing compact wiring while avoiding the problem of breakage of the wires.

III. Internal Frame Unit FU

The principal component parts of the instrument are encased in the previously described housing unit HU and are attached to the internal frame which is capable of being drawn out from the housing unit. It is possible to pull out this frame unit to observe the operating state or to check and adjust the instrument whenever necessary, including periods when the instrument is in operation.

FIG. 6 is a general view of the internal frame unit FU, and FIG. 7 and the following diagrams are exploded views of component elements, including an internal frame 30; its side plates 31 and 32 which are made of die-cast aluminum alloy and molded into a predetermined shape; support members 301 and 302 which are formed in the upper and lower regions of the left side plate 31 and include hinges cooperating with shafts 303, 304 fitted therein and the support pieces 144, 145 in the housing unit HU, the hinges serving as supporting pivots to draw out the internal frame 30; upper and lower beams 33 and 34 which bridge across the side plates 31 and 32; and a recording chart holder 35 interposed between the two beams and having a substantially Y-shaped cross section.

The upper and lower beams 33, 34 and the chart holder 35 are made from shapes (as previously discussed above) which are molded of aluminum alloy. The transverse frame 22 of the electric power source unit EU is also made from shapes. The $\Omega$-slit formed in each shape serves as an open hole for threading. Screw setting is effected directly by inserting a tapping screw through this hole, thus achieving reduction of the number of requiring machining steps. Moreover, because the shape is an extruded long linear material having a fixed cross-sectional form, it can be cut to match the widths of recording charts to be used in a variety of instruments employing common parts, thus providing interchangeable indicating recorders adapted for mass production.

Chart keepers 331 and 332 are made of thin leaf springs and are fixed to the upper beam 33. These chart keepers feed the chart C smoothly along the outer surface of a sprocket (which will be described afterward). Two narrow arcuate keep pieces 333 protruding towards the feed teeth on the two sides of the sprocket prevent the chart from slipping off the outer surface of the sprocket.

A space R1, defined above the upper beam 33, is provided for accommodating recording elements such as dot printing mechanism and recording pen mechanism. Other elements, such as a balancing motor and a transfer switch, are positioned towards the back of R1. A front space R2 is defined between the lower beam 34 and the chart holder 35, and serves as a storage chamber for a recorded chart. A rear space R3 is defined behind the lower beam 34, and is provided for holding the control printed-circuit board mechanism 27 of electric power source unit EU. A space R5, defined between the lower beam 34 and the bottom plate 14 of housing unit HU, is provided to house any additional mechanism that might be required by the instrument.

Figure 8:
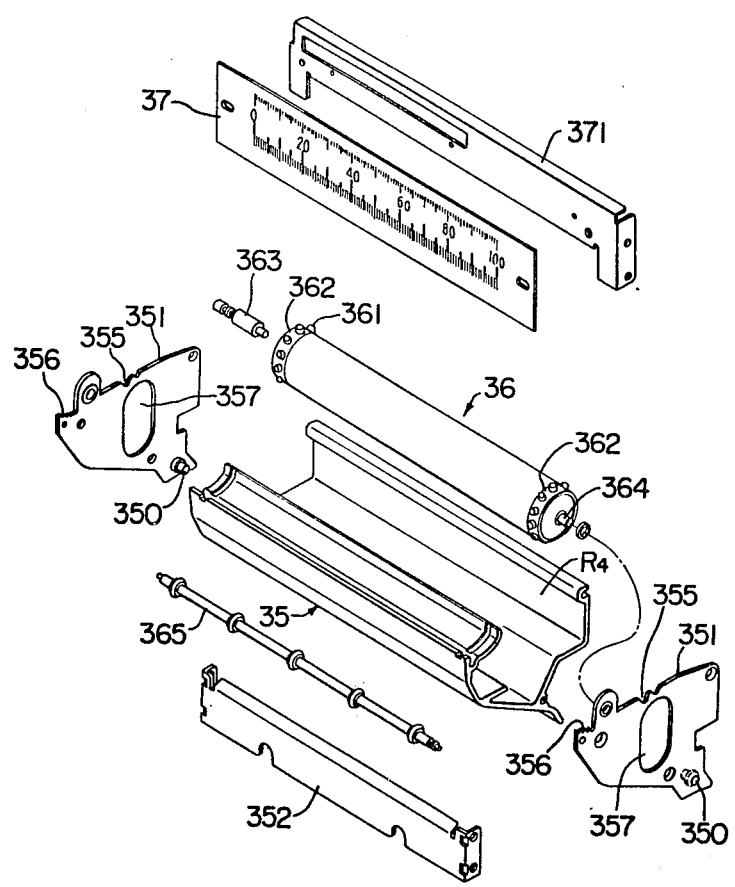
Figure 9:
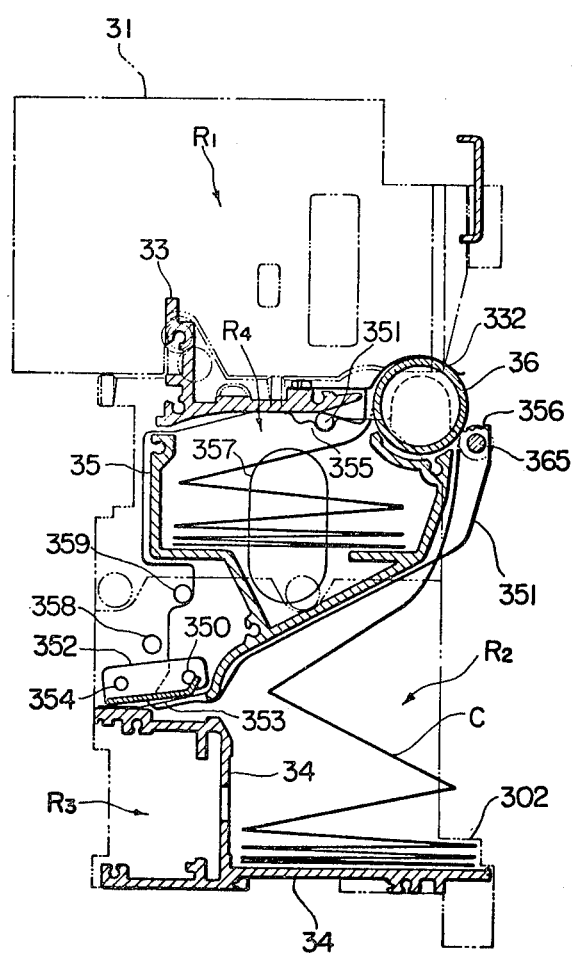
Figure 10:
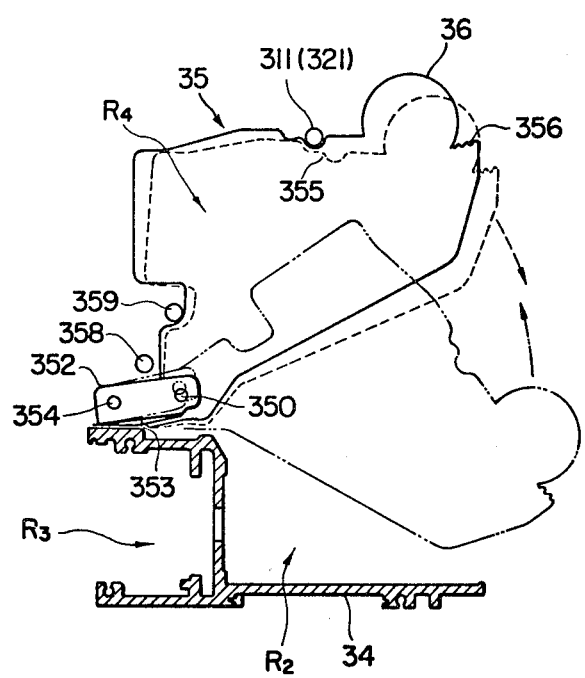
Figure 11:
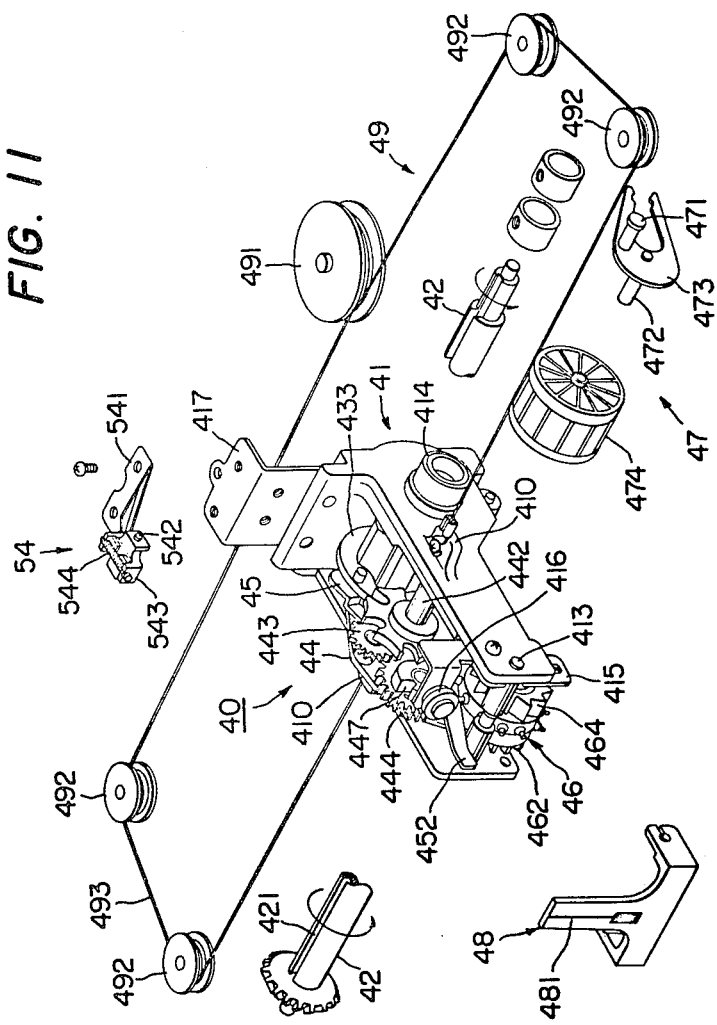
Figure 12:
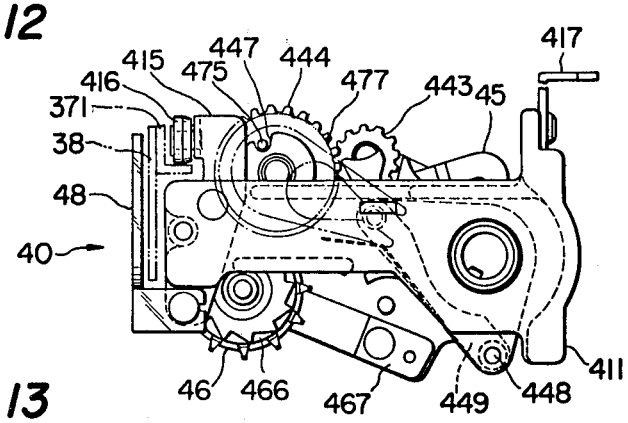
Figure 13:
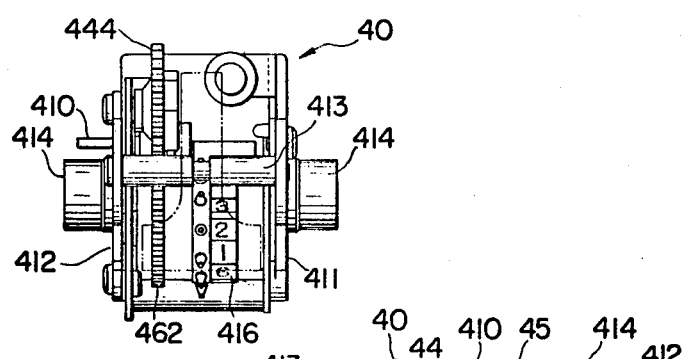
Figure 14:
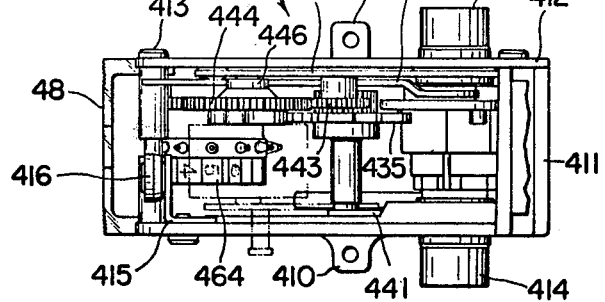
Figure 15:
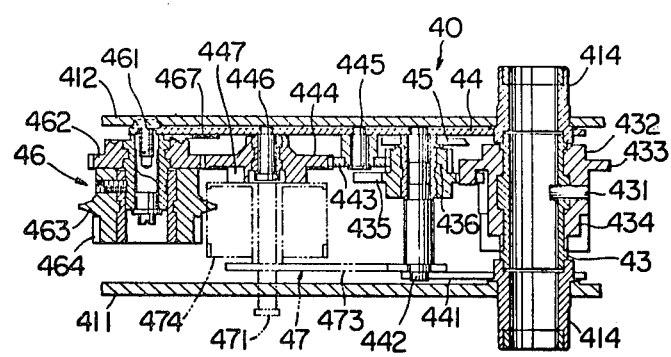
Figure 16:
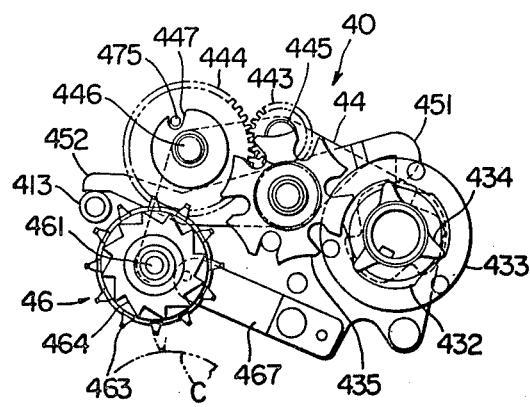

As illustrated in FIGS. 8, 9 and 10, symmetrical lateral plates 351, 351 are attached to the left and right of the chart holder 35, thus defining a storage space R4 for storing a nonrecorded folding chart C.

A leaf spring 353 is interposed between a mount plate 352 and the lower beam 34 for exerting an upward force on the mount plate 352. The left and right ends of the mount plate are rotatably attached to side plates 31 and 32 by shafts 354, 354.

A sprocket 36 is interposed between the two lateral plates 351 and feed wheels 362 having teeth 361 fixed on the two sides of the sprocket 36. Of the two sprocket shafts 363 and 364, the left shaft is longer than the right one, although not shown, a unidirectional transmission type roller clutch and a friction mechanism with an annular spring are provided in the fitting portion. Dual gears G23 and G231 in a drive mechanism (to be described later) are fixed on a portion protruding from the lateral plates 351 of shaft 263.

The roller clutch either engages or disengages depending on the direction of rotation of its driving side. The friction mechanism is capable of disengaging the driving system from the driven system by applying an external force greater than a predetermined value. Consequently, when loading the chart, for example, it becomes possible to manually rotate the sprocket 36 counterclockwise or to rotate the same in the opposite direction by application of such greater force, thus eliminating slack in the chart and avoiding delay of the chart feed in the initial stage of recording.

The sprocket 36 is immersed in, or coated with, a synthetic resin liquid after machining. Thus, a thin water-repellent film is formed on the cylindrical surface of the sprocket. This prevents penetration and staining of recording ink and ensures a clear trace of a dot printing stylus and smooth travel of a recording pen.

A keep roller 365 is positioned parallel to the sprocket 36. A coil spring is provided in one end of the roller 365 so that its length is resiliently variable. The roller is detachably affixed between the two lateral plates 351. Two-step arcuate notches 355, each having a deep recess and a shallow recess, are formed on the left and right lateral plates 351 at positions opposite to the pins 311 and 321 which are fixed on the inner surfaces of side plates 31 and 32. Finger grips 356 are formed of small recesses and protrusions on the lateral plates 351 and oval holes 357, through which the storage space R4 can be observed from the outside, are also defined on the plates 351.

FIG. 9 illustrates the holder 35 being housed in the internal frame 30. When the holder 35 is pressed down against the force of leaf spring 353 by pressing down on the grip 356 with the finger, the arcuate deep recesses of notches 355 disengage from the pins 311, 321. The adjacent arcuate shallow recesses then engage with and are locked into the pins. This operation is shown by the dotted line in FIG. 10, when the recording element is spaced apart from the chart.

When the holder 35 is depressed further downward, the resilient force of leaf spring 353 is exerted on the mount plate 352 and presses the mount plate against a stopper pin 358. Subsequently the holder 35 is released and rotated around the shaft 350 to be drawn out toward the front, as shown by the two-dot chain line. In this manner the chart C can be removed from the space R4 of holder 35 for replacement.

When the holder 35 is rotated in the opposite direction after replacement of the chart, it is brought to a stop at a position (shown by the dotted line) before there is any direct contact between the recording element and the chart. In this position, if the holder 35 is pushed further inwardly after checking the condition of the chart and the pen (recording element), the holder 35 abuts against the upper stopper pin 359 to prevent excessive advancement, and the notches 355 abut against the pins 311 and 321 to lock the holder at the solid-line position. This completes the set up of the chart for recording.

In summary, the chart holder 35 is automatically locked and stopped immediately after its outward advance and immediately before its inward return. It is then moved up or down beside the chart to set it ready for recording, thereby eliminating any fault which might result from the initial contact between the recording pen and the chart.

A scale is shown on number 37, and a scale holding plate 371 is shown having a U-shaped cross section. Both ends of the scale holding plate 371 are anchored to the side plates 31 and 32 by screws, and the wires from an alarm mechanism are received therein. Both the alarm mechanism and the dot printing mechanism are partially supported by the top surfaces of the upper and lower portions of the scale holding plate.

A metallic lock member 38 locks the internal frame 30 to the housing unit HU. This lock member 38 has a knob plate 382 with a bearing 381, a pressure spring 383 made of a slender leaf spring cut halfway and bent, a pawl plate 384 with a protrusion, and a roller 385. The forward end of one cut piece of the pressure spring 383 is anchored to the knob plate 382. In FIG. 7, the knob plate 382 and others are fitted to a mount shaft 386 protruding from the lower end of internal frame 30. A retaining ring is also attached to the shaft.

A block-like lock piece 146, shown in FIG. 2, is fixed at the lower right corner in the housing unit HU. The pawl plate 384 is positioned opposite to the rear half of the lock piece 146, while the roller 385 is positioned opposite to its front half. When the drawn out frame unit FU is returned into the housing unit HU, the roller 385 is rotated by contact with the front-half plane of lock piece 146. The pawl plate 384 is moved inwardly while it is kept in contact with the rear-half inclined surface. After the stepped portion of the pawl advances beyond the lock piece 146, the pawl plate is rotated slightly and is locked. Since the locked frame unit FU is supported by the roller 385, it is possible to protect the hinge mechanism which includes the shaft 303 and so forth. Also, the harmful effect resulting from external vibration applied to the dot printing mechanism and other components attached to the internal frame 30 can be eliminated.

When the upper end of knob plate 382 is drawn towards the side, the free end of the cut piece of pressure spring 383 exerts a force on the protrusion and rotates the pawl plate 384 to unlock it, thereby permitting the frame unit FU to be drawn out of the housing unit HU. A pair of similarly shaped mount plates 39 are fixed by screws to the right surfaces of both the left and right side plates 31 and 32. These mount plates 39 support the drive shaft and the support shaft of the indicating recorder mechanism by bearings. (The indicating recorder mechanism will be described below).

The structure of the dot printing mechanism 40 is shown in FIGS. 11 through 16, in which: a dot printing frame 41 has a base frame 411 and a rear wall and a right wall which are integrally molded; a left side plate 412, a shaft 413 coupling the fronts of the base frame and the left side plate; bearings 414 which are pressed into the left and right of dot printing frame 41; a mount piece 410 protruding from each side of the frame for mounting on a string; a metallic fitting member 415 attached to the front of a base frame 511; a roller 416 of synthetic resin located in one portion of the metallic fitting member 415; an arm 417 is provided for mounting a brush of a slide rheostat, the operating protrusion of an alarm mechanism and so forth; a drive shaft 42 which is supported by the mount plates 39 and has a key slit 421 formed in its longitudinal direction; and a cylindrical slide shaft 43 which is fitted loosely in the drive shaft 42 and equipped with a pin 431 engaged with the key slit 421.

The slide shaft 43 is rotatably retained between the left and right bearings 414. The drive shaft 42 is fitted into the slide shaft 43 and the two bearings 414 of dot printing frame 41, which transmit the torque to the slide shaft 43 while sliding on the drive shaft 42. In this case, the front of dot printing frame 41 is held by the roller 416 in continuous contact with the lower region of the holding plate 371 to prevent printing frame 41 from falling. The slide shaft 43 is equipped with a recessed cam 432 having three recesses, a geneva cam 433 with three pins on one side thereof, and a protruding cam 434 having three steep triangular protrusions. The protruding cam 434 is used to provide a dot printing skip when necessary.

The ends of a first movable plate 44 and a second movable plate 441 are fitted loosely into the bearings 414, and a swing shaft 442 is fixed between the plates. A geneva 435 and a gear 436 are fitted loosely in the swing shaft 442, to which a swing lever 45 is rotatably attached. The pointed transverse extension 451 of the swing lever 45 is positioned opposite to the recessed cam 432 on the slide shaft 43, and its other end 452 is in contact with the upper portion of the coupling shaft 413.

Gears 443 and 444 are mounted, respectively, to shafts 445 and 446. These shafts are fixed to the first movable plate 44.

A dot printing wheel 46 is rotably mounted with the gear 462 on the dot printing shaft 461 which is fixed to the first movable plate 44. The dot printing wheel 46 is equipped with 12 radially arranged dot printing styli 463. A digit 464 having 12 sawteeth and displaying digits on its inclined surface is provided beside the styli 463.

A click spring 467 has one of its ends towards the first movable plate 44, and its free end forms a semispherical protrusion which sequentially engages with 12 recesses 468 formed on one lateral circumference of the dot printing wheel 46. An ink pad mechanism 47 includes a U-shaped holder 473 having a stop pin 471 and a mounting shaft 472. A pad wheel 474 is detachably affixed to the mounting shaft 472. The pad wheel 474 has ink pads which contain ink of different colors and are equal in number to the dot printing styli.

The free end of the holder 473 is detachably fitted into a groove defined on the circumference of swing shaft 442. The pin 471 is held in contact with the top surface of dot printing frame 41. In this condition, a short engaging pin 475 provided on one side of the pad wheel 474 engages with a hole 447 of the gear 444.

A pointer 48 attached to the front of dot printing frame 41 is made of a transparent plastic material and has, at its center, a red index line 481 which is opposite to graduations of the scale 37. A leaf spring 449 (shown by a dotted line in FIG. 12) is placed along the inside of base frame 411, and its two ends are anchored to the swing shaft 442 and the coupling shaft 448, while its branch region is brought into contact with the end of holder 473. The pad wheel 474 is held in contact with the printing styli 464 by the leaf spring 449.

Figure 17:
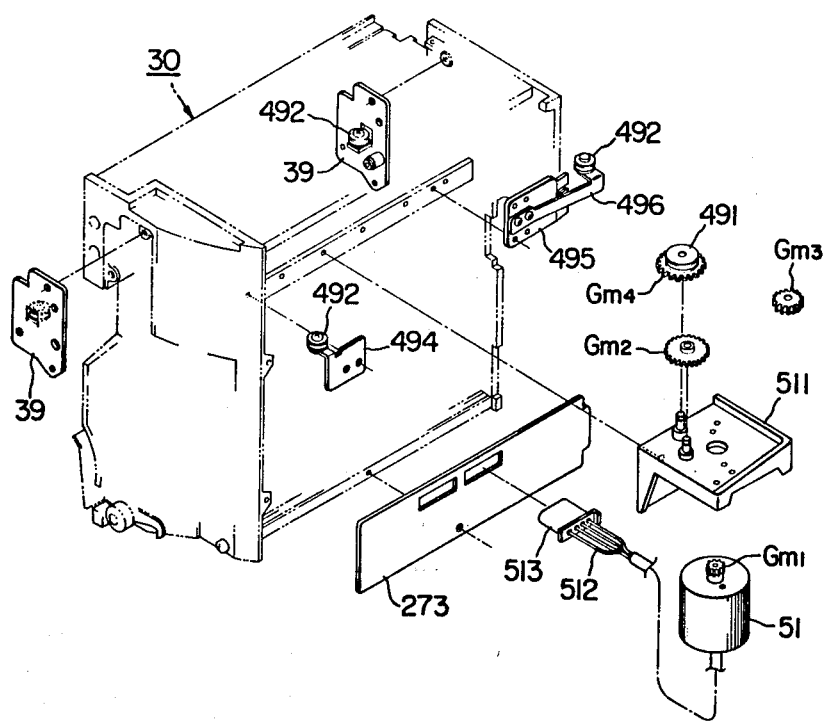

A pulley mechanism 49 (FIGS. 6 and 11) includes a large drive pulley 491, four small idle pulleys 492 and a string 493. Of the four idle pulleys 492, the front two are located on the left and right mount plates 35, while the rear two are fixed to the back of upper beam 33 (as illustrated in FIG. 17). One of the rear pulleys is supported by a mount plate 494 and the other is supported on one side by a comb-like mount plate 495 and a slender leaf spring 496. The middle region of leaf spring 496 is opposite to the comb teeth so that excessive bending of the spring is limited. One end of the spring 493 is anchored to one attachment piece 410 of the dot printing frame 41 and, after engaging with the two pulleys 492, the middle portion of the string is wound around the drive pulley 491 a few turns. The other end of the string is anchored to another attachment piece 410 through the other two pulleys 492.

Since one of the idle pulleys 492 is mounted on the slender leaf spring 496, this spring serves as a buffer when any external force is suddenly applied to the movable part (that is, the dot printing mechanism). Consequently, application of large amounts of tension to the string 493 is avoided, thus preventing breaking of the string. The remaining comb teeth of the mount plate 494 are used with the first and second pens.

FIGS. 6 and 17 show a balancing motor 51; a mount frame 511, a row of gears Gm1–Gm4, of which Gm1 is an output gear of motor 51; a leadwire 512, and a connector 513. The final-stage gear Gm4 is secured to the drive pulley 491. The connector 513 is inserted into the printed-circuit board mechanism 27 through a hole formed on the back lid 273 of the previously described room R3.

As illustrated in FIG. 6, a resistance mechanism 52 has a cover plate 521 over the internal frame 30. The cover plate 521 is made of a shape having, on its back, a plane 523 of fixed width divided by a plurality of parallel partitions 522. The rear of the cover plate 521 is supported by two shaft pins 524 behind the upper end of internal frame 30. Usually the front of the cover plate is screwed into hole 526 by screw 525 to cover the top surface of internal frame 30. However, when this screw is removed, the cover plate is permitted to rotate around the shaft pin 524 and thus can be opened.

A slide rheostat 53 includes a base plate 531 made of a nonconductive material, a slide resistance wire 532, a return wire 533, leadwires 534 and a connector 535. The base of the slide resistance wire 532 is made by coarsely winding a resistance wire around a surface-insulated core, while the return wire 533 uses a metallic wires as its base. A conductive plastic thin layer is applied to each of these two bases to form a hydrid resistor. This slide rheostat, as compared with the ordinary type in which a resistance wire is wound around a base, advantageously prevents the formation of an oxide film on the contact surface, provides anti-corrosion and anti-abrasion properties, and further enhances the resolution to a high value. As illustrated, the slide rheostat 53 is a unit and is detachably mounted on one plane region 523 by screws.

A brush 54 (FIGS. 6, 11 and 18) includes a V-Shaped holding spring 541, a square insulator table 543 supported at the vertex of the holding spring by a shaft pin 542, and a coil contact 544 detachably affixed to the table 543. The coil contact 544 is supported with its two ends and center held against the insulator table 543. This coil contact is mounted on an arm 417 of the dot printing mechanism 40 such that it is opposite to the slide rheostat 53. The contact 544 is disposed at right angles to the table 543 which is capable of rotating around the shaft pin 542 at the vertex of the holding spring 541 which is vertically movable. Thus, the contact can be displayed in many directions and can be maintained constantly in touch with the slide rheostat 53 at a uniform pressure. Because the contact 544 is formed of a coil and its displaceable portions among the three support points are opposite to the resistance wire 532 and the return wire 533, respectively, constant contact between the contact 544 and the slide rheostat 53 is further ensured.

An indicating recorder mechanism has a chart holder 35 including a sprocket 36 loaded with a chart C, a scale 37, a dot printing mechanism 40 and a balancing motor 51. The operation of the indicating recorder mechanism is as follows.

The torque of a synchronous motor (to be described subsequently) is transmitted directly to the sprocket 36 to drive the chart C at a fixed speed. The rotation of the same synchronous motor is converted by a geneva mechanism to intermittent rotation. This intermittent rotation is then transmitted to the drive shaft 42 of the dot printing mechanism 40 and is also supplied to a transfer switch for changeover of measuring points. Because of the rotation of the drive shaft 42, the slide shaft 43 also rotates in the same direction. The initial intermittent rotation is further converted, by the geneva mechanism 433 and 435, to a finer intermittent rotation for driving the dot printing wheel 46 to make a 1/12 rotation via the gears 436, 443, 444 and 462 in this sequence, thereby changing the stylus 463.

Simultaneously with changeover of the dot printing wheel 46, the pad wheel 474 also makes a 1/12 rotation through engagement between the pin 275 and the hole 447 of the preceding gear 444, so that the stylus 463 comes into contact with the pad for linking. At this stage the intermittent rotation is interrupted once.

In the meantime, the input voltage is compared with the feedback voltage between one of the slide resistance wires 532 of resistance mechanism 52 (constituting a partial measuring circuit) and the position of contact 544 on the brush 54. The balancing motor 51 is rotated either in the forward or reverse direction to eliminate the difference between the two compared voltages.

The motor rotation shifts the dot printing mechanism 40 on the drive shaft 42 through the pulley mechanism 49 and brings it to a stop in the balanced state at a position corresponding to the input signal. As a result, the pointer 48 indicates a graduation on the scale 37 representative of the measured value. During this period, the intermittent rotation, which was previously interrupted, is resumed so that the pointed end 451 of the swing lever 45 falls into the notch of the recessed cam 432. Also, the swung lever 45 rotates clockwise around the tail 452 (see FIG. 16), thereby rotating the dot printing wheel 46 around the bearing 414 through the first movable plate 44 and shifting this plate downwardly.

The stylus 463 is then brought into contact with the chart C to record the measured value. The dot printing wheel 46 is shifted upwardly as the drive shaft 42 further rotates, and simultaneously with the changeover of the measuring point by the transfer switch, the abovedescribed operation is repeated. Thus, the measured values are indicated and recorded sequentially at the 12 measuring points.

Figure 18:
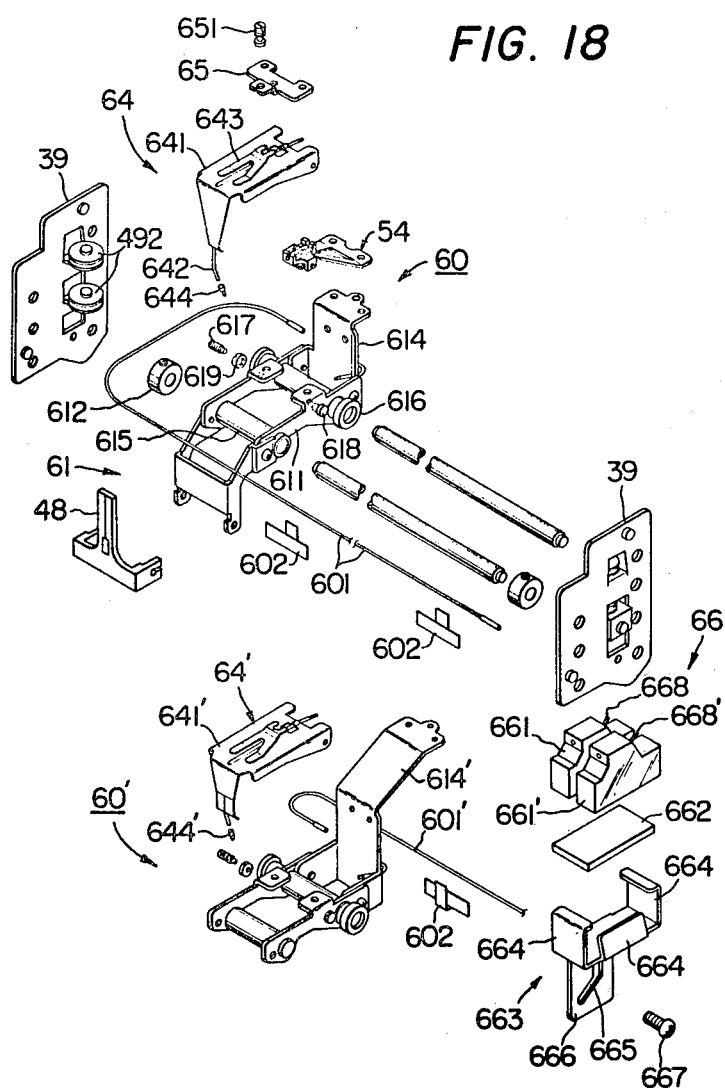

When the measuring point is at one, a pen-writing type of recording mechanism using ink as a recording element is employed instead of the aforementioned dot printing mechanism 40. The structure of such a recording pen mechanism 60 is illustrated in FIG. 18, in which: a pen frame 61 includes left and right side plates 611, 612, a front plate 613 and a rear plate 614; and cylindrical front and rear bearings 615 and 616 are shown.

The pen mechanism 60 is supported by two shafts 62 and 63 which are loosely fitted to the bearings 615 and 616. The front shaft 62 is relatively loose in fitting while the rear shaft 62 is tight. The ends of both shafts 62 and 63 are supported by bearings in the mount plate 39. Support pins 617, 618 have tapered portions at their respective fore ends, and the pin 617 is screw-fitted into the side plate 611 with its fore end being adjustably positioned to be locked at a desired position.

A pen 64 includes a pen holder 614 made of an L-shaped thin leaf spring, a metallic ink pipe 642, and an adjusting spring 643 formed in the shape of an inverted V. The rear of the pen holder 641 is rotably held by the support pins 617 and 618. The ink pipe 642 extends along the inside of holder 641 and is attached thereto. The fork-like end of the adjusting spring 643 is anchored to the top surface of holder 641, while the bent free end of the spring extends upward obliquely. A holding plate 65 bridges the tips of side plates 611, 612 and has a screw 651 at its fore end which engages with the adjusting spring 643.

The pen 64 is rotatably supported around the pins 617, 618, and a pen-point 644 provided at the tip of the ink pipe 642 is brought into contact with the chart C. In this case, the resiliency of the spring is increased by turning the screw 651 inward to increase the pen pressure, or is decreased by turning the screw outward to decrease the pen pressure. A pointer 48 and an arm 417 have the same structure and function as was previously described with respect to the dot printing mechanism 40. The pointer 48 is fixed to the front of the pen frame 61, and a brush 54 is attached to the arm 417.

Another pen shown in the lower part of FIG. 18 is a second recording pen mechanism employed in a two-pen type recorder. With the above-described recording pen mechanism 60 serving as a first pen, the second recording pen mechanism is installed on two shafts 62' and 63' disposed under the front shaft 62 and the rear shaft 63. In the second pen mechanism 60', the pointer 48 and the front plate 613 used in the first pen mechanism 60 are removed, and a rear plate 614' with a long upwardly protruding extension is used instead of the rear plate 614. A pen 64' has a short holder 644', and its front is coated with colored paint such as green to serve as an index.

Shown in the lower right part of FIG. 18 is an ink receptacle 66 having two bodies 661 and 661', a base 662, plate and a holder 663 made of a thin plate. An enclosure plate 664 is provided along the three sides of holder 663, and a leg 666 with an arcuate slit 665 is formed near the lower part of the holder.

As illustrated, the ink receptacle 66 is attached to the outside of internal frame 30 by a screw 667 passing through the arcuate slit 665. The ink stored in the bodies 661, 661' is fed to pen-points 644, 644' via ink tubes 601, 601' connected to delivery pipes 668, 668'. In the case of single-pen type, a spacer is provided in the holder 641 instead of the ink receptacle. Tilting the ink receptacles 66, 66' by moving the leg 666 along the arcuate slit of holder 641 makes it possible to adjust heights of these receptacles relative to the pen-points. Thus, when the instrument is installed on an inclination, a substantially constant ink head can be maintained.

A hook 602 has an adhesive on its plane portion and serves to hold the ink tube, wiring, and so forth. In this example, the ink tube 601 is held thereon. In the drawing, a prime sign (') is added to the reference numeral of each element belonging to the second recording pen mechanism. When the instrument structure is of singlepen type, there can be some permissible modifications such as omission of terminal board 232 or removal of transfer switch. In the case of the two-pen type, installation of an additional transformer 241 and so forth may be required in accordance with the increase of the number of measuring circuits.

Figure 19:
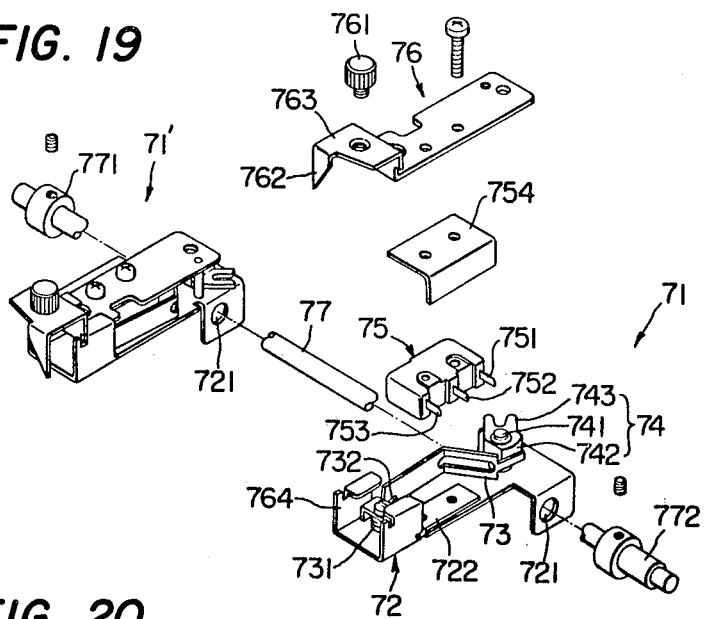

FIG. 19 illustrates the structure of an alarm mechanism 70, which has upper and lower limit setters 71, 71'. Since the two limit setters are symmetrical, the structure will be described only with respect to the upper limit setter 71, shown in an exploded view.

A chassis 72 of the upper limit setter has a rear U-shaped portion defining a mount hole 721. FIG. 19 shows a rubber sheet 722; an L-shaped actuating piece 73 which is supported by a screw shaft 731 and receives a counterclockwise force from a spring 732; a swing member 74 rotatable around a shaft 741 on the chassis 72 and having a chevron-shaped inclined surface 742 kept in contact with the free end of the actuating piece 73, its other end formed into a fork 743; a microswitch 75 having terminals 751-753; an actuator protruding from the other side of the drawing coming into contact with the midpoint of actuating piece 73; an insulator cover 754; a top plate 754 which is equipped with a set-screw 761 and has a knife-like index 762 at its fore end; a holding bar 77 which has two ends that are supported by the mount plate 39; and cylindrical stopper and mounting shafts 771 and 772.

The setter 71 of the above-described structure is slidably installed on the holding bar 77 through the hole 721. The upper region of the scale holding plate 371 is interposed between the U-shaped bent portion 763 and the protrusion of the top plate 76, and the index 762 is placed opposite to the graduation of scale 37.

When the set-screw 761 is tightened, the holding plate 371 is pinched between the screw 761 and the protrusion 764 to firmly fix the setter 71. Loosening the screw 761 permits the setter 71 to be moved along the holding bar 77. Meanwhile, a metallic fitting member with a protrusion is attached to the vertical region of the arm 417 in the dot printing mechanism 40 or the recording pen mechanism 60. When the mechanism 40 or 60 is moved in accordance with the measured value and reaches the position of setter 71, the protrusion on the fitting member drives the swing member 74. Then the actuating piece 73 rotates around the shaft 731 to displace the actuator to open or close the microswitch 75 to perform alarm operation. If necessary, an alarm mechanism can be disposed together with an alarm scale positioned behind the internal frame 30.

Figure 20:
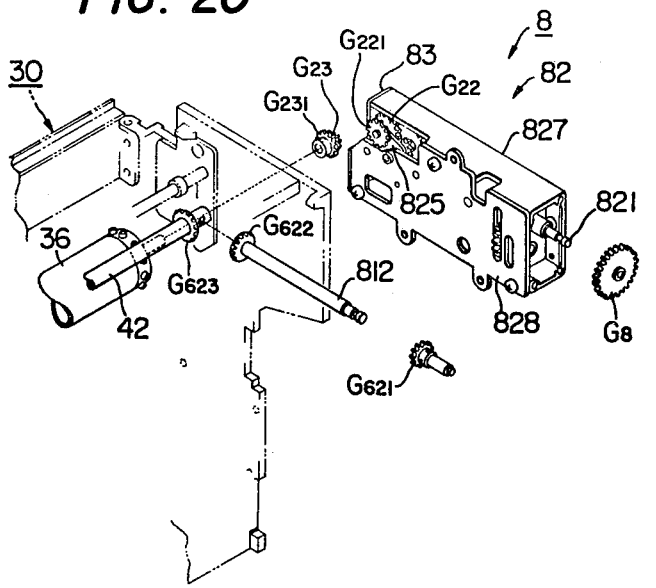
Figure 21:
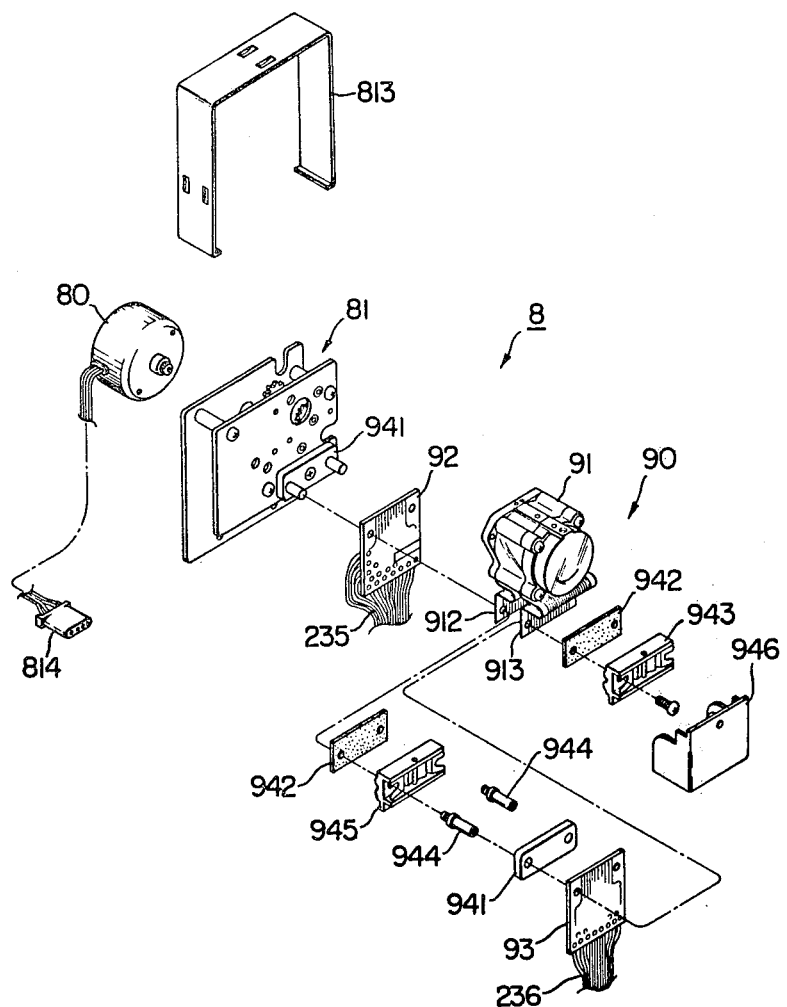

FIGS. 20 and 21 show a drive mechanism 8 which itself is driven by the synchronous motor 80. This drive mechanism 8 is broadly divided into two groups: a gear group disposed in a pair of holding plates 81 located behind the internal frame 30, and a gear box 82 which is installed on a power switch mechanism 25 located in the vertical space along one side of the internal frame 30.

Figure 22:
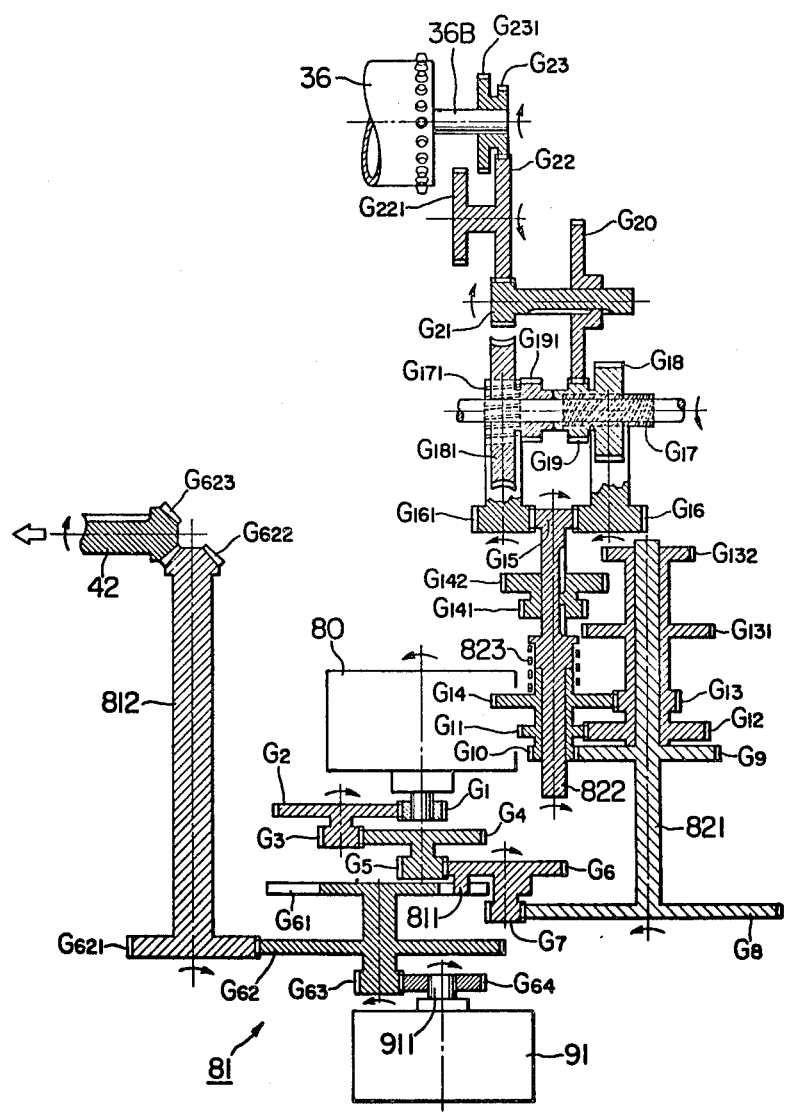

FIG. 22 illustrates the structure of the entire gear systems of these two groups, in which: G1 is an output gear of synchronous motor 80; G2, G3, G4, G5, G6 and G7 are dual gears connected to G1, and G6 is equipped with a pin 811; G61 is a geneva gear engaged with the pin 811; G62 and G63 are gears operating with the geneva gear G61, with G63 being in engagement with an input gear G64 of the next transfer switch 91; and G621 is a gear located on a long shaft 812 and engaged with the gear G62. A bevel gear G622 located at the other end of the long shaft is engaged with a bevel gear G623 on the drive shaft 42 in the dot printing mechanism 40, to transmit 120° intermittent rotation to the drive shaft 42.

The gears G1–G7, G61–G64 and G621 belong to the first gear group and are used for selectively setting the intermittent rotation in a fixed relation between the dot printing mechanism 40 and the changeover mechanism 91 and further determining the operation time interval thereof.

Two parallel shafts are shown as shafts 821 and 822. Two stationary gears G8, G9 engaged with gear G7 and also four gears G12, G13, G131, G132 coupled to one another are mounted on the shaft 821. Dual gears G10, G11, G14 fitted loosely and a stationary gear G15 are mounted on the shaft 822. A clutch mechanism 823, interposed between the gear G14 and the shaft 822, is made of, in this example, a spiral spring wound around its cylindrical portion.

Gears G141 and G142 are slidable along the slits of shaft 822 and correspond to G131 and G132 respectively. When either of these two gears engages with a corresponding gear, the shaft 822 is rotated at a faster speed to loosen the clutch 823, thereby effecting automatic changeover of the transmission system and the rotation speed. Assuming that the ratio of rotation between the change gears G13→G14 is 1, it is increased to 4 between G131→G141, or to 2 between G132→G142.

Of the parallel gears G16 and G161 engaged with the gear G15, the G16 gear is connected to a pair of spiral gears G17 and G18, and gear G161 is connected to a worm G171 and a worm gear G181. The gears G17 and G171 change the direction of transmission of the succeeding gear row at right angles, so that rotation is transmitted directly to the spiral gears without any change, but the rotation speed to the worm is reduced to 1/60.

Gears G19 and G191 are secured to gears G18 and G181, respectively, and a gear G20 is capable of moving on the shaft 824 to be switched to G19 or G191. A gear G21 is fixed on the shaft 824. Of the dual gears G22, G221 and G23, G231, the gear G22 is in engagement with G21 and G23, and both gears G23 and G231 are interchangeably mounted on the shaft 363 of sprocket 36. If the power supply frequency is 60 Hz, the gears G221 and G231 engage with each other, while in any area where the frequency is 50 Hz, the illustrated combination is selected.

The gears G22 and G221 are mounted on a movable plate 825 which is capable of rotating concentrically with the preceding-stage gear G621, and a leaf spring (not shown) is attached to the movable plate 825. Consequently, the leaf spring exerts a counterclockwise force (as viewed from left of FIG. 20) on the gears G22 and G221, which are provided to be displaceable within a predetermined range against the forces of the leaf spring.

The gear groups beginning with the gear G23 are housed in a gear case 82 which has a U-shaped case frame 827 as shown in FIG. 20. The structure is made from shapes as previously described.

A mount plate 828 covers the open surface of case frame 827; and a front plate 83 has holes 831 and 832 having vertical two-step notches, where change levers 833 and 834 are disposed. The upper change lever 833 is for switching G20 to G19 or G191, while the lower change lever 834 is for sliding G141 and G142. Accordingly, as indicated on the front plate 83, the chart speed per unit time of one hour and one minute can be changed in six steps to 25 mm, 50 mm and 100 mm. A U-shaped cover for holding plate 81 is indicated by number 813, and a connector for the synchronous motor is indicated by number 814.

In a changeover mechanism 90, a transfer switch 91 is attached to the holding plate 81. This switch has two positions (or one position in 6-point printing) which are substantially equal to each other, each of which being equipped with a change shaft 911 where the gear G64 is fixed. The change shaft 911 has a movable contact which short-circuits a multiplicity of radially printed contacts to a common contact located inside.

Flexible film-like leadwires 912, 913, connected to the internal movable and stationary contacts, are introduced on the surfaces where the base plate and the cover are mounted and also to the superimposed surfaces of both upper and lower (left and right) positions.

Moreover, an O-ring is provided between the superimposed surfaces to hermetically seal the same, thereby providing an oil switch filled with oil. Due to the inclusion of such an oil switch, accurate transfer action is ensured with excellent insulation characteristic and minimum wear.

Printed-circuit boards 92, 93 are connected to the leadwires 235, 236 in the electric power source unit EU and are positioned on the same conducting surfaces as the leadwires 912, 913. Numeral 941 shows a base plate of the same structure; 942 shows an elastic plate; 944 shows a screw stud; 945 shows a stationary frame equipped with a non-uniform pressure spring 943 which applies its resilient force to some regions of the conducting surfaces of the leadwires 912, 913; and 946 shows a cover. The above-mentioned components can be sequentially fixed by lamination on the holding plate 81 by the use of screw studs 944 in the order of base plate 941, printed-circuit board 92, leadwires 912, elastic plate 942 and stationary block 945.

In the drive mechanism 8 of the above-described embodiments, the chart feed speed is switched by a six-step changeover system which is a multiplicative combination of a three-step system (1:2:4) and a two-step system (1:60). However, the drive mechanism may include either system alone, or the speed may be merely single. When a pen-writing type recording mechanism is employed in the indicating recorder with the number of measuring points ranging from 1 to 3, the gear systems of G61-G64 and G62, G621-G623 are omitted.

Although the foregoing description relates to a situation where a single resistance mechanism 52 is mounted on the cover plate 521 in the internal frame unit FU, it is also possible to mount the same resistance mechanism 52 on the five parallel rows of plane regions 523 on the cover plate 521 and to also mount a brush 54 in the recording element (dot printing mechanism 40 or recording pen mechanism 60). This arrangement provides an indicating recorder controller capable of performing control action of an equivalent instrument of cascade type.

In this embodiment, the space R5 (FIG. 2) defined in the lower region of internal frame 30 may be used to accommodate control knobs for proportional, derivative and integral control action. Additionally, it is possible to utilize the space R5 to house a lamp for an alarm mechanism and other operating parts for accessory mechanisms, for example, a selector knob of a multirange recording meter. This allows operation from the front with the door 11 left open for observation of the lamp, and so forth, through the transparent window in the door 11. In this instance, the recording card 115 is moved to the middle region of the door by the protrusion of style strip 114 and is held there, and the front of space R5 is left open.

Thus, the present embodiment of the invention provides an automatic balancing type indicating recorder which is capable of accomplishing its intended objectives and further achieving the variety of advantageous effects as was explained herein. The above description is intended to be illustrative and not limiting the scope of the invention, as set forth in the following claims and all equivalents thereto.

We claim:
1. An indicating recorder comprising:
a housing unit having a front door, said housing unit being composed entirely of a square prismatic housing;
an internal frame unit located within said housing unit behind said front door;
said internal frame unit comprising (1) left and right side plates positioned respectively adjacent the corresponding sides of said housing unit, (2) an upper beam extending transversely between said side plates, (3) a lower beam extending transversely between said side plates, and (4) a recording chart holder also extending transversely between said side plates;
said beams and said chart holder being formed as shapes having uniform cross-sections;
said internal frame unit having secured thereto an indicating recorder mechanism, a chart feed mechanism and electrical resistance means for sensing the indicator position;
support means integral with said housing unit at one side thereof, said support means including means to accommodate swinging movement of a device supported thereby about a vertical axis;
means mounting said internal frame unit on said support means to provide for swinging movement of said frame unit about said vertical axis, into and out of said housing unit;
an electric power source unit located in a space in said housing unit separate from said swingable internal frame unit, said electric power source unit comprising a unit frame fixedly secured to said housing unit independently of said frame unit; and
an electric power transformer and terminal board means forming part of said power source unit to remain fixed in position within said housing unit when said frame unit has been swung out to provide access to said recorder mechanism or the other elements mounted on said frame unit.

2. The indicating recorder as set forth in claim 1, wherein said housing unit includes: (1) a generally rectangular front frame, (2) a shell, (3) a bottom plate, (4) an intermediate plate at the rear of said shell, and (5) a back plate behind said intermediate plate;
said front frame being formed with L-shaped flanges at the upper and lower regions thereof and extending forwardly therefrom;
said front frame further including at its rear surface a generally rectangular upright plate having its four corners cut off, the four side edges of said plate between said four corners being bent towards the rear of the recorder;
each of said cut-off corner portions being filled by a reinforcing element formed of a triangular plate bent at right angles along a perpendicular line.

3. The indicating recorder as set forth in claim 1, wherein said housing unit includes block-like reinforcing support pieces attached to corners thereof, a pair of said block-like support pieces being positioned at upper and lower regions respectively and providing support for said internal frame unit.

4. The indicating recorder as set forth in claim 1, wherein said unit frame of said electric power source unit comprises a transverse frame composed of a shape with a recess; and
leadwires for connecting said terminal board to said internal frame unit housed and held in said recess.

5. The indicating recorder as set forth in claim 1, including:
a vertical plate forming part of said housing unit at the rear thereof;
said vertical plate being formed with holes at predetermined positions with respect to said unit frame in said electric power source unit fixed in said housing unit to provide for access to said terminal board means through said holes.

6. The indicating recorder as set forth in claim 1, wherein said electrical resistance means comprises a movable recording element forming part of said indicating recorder mechanism and having an arm;
a brush mounted on said arm; and
a slide rheostat formed of a resistance wire and a return wire arranged at the rear of said internal frame unit;

said brush being arranged to contact said slide rheostat to produce an electrical signal responsive to indicator position.

7. The indicating recorder as set forth in claim 6, wherein said brush comprises a V-shaped holding spring mounted on said arm of said recording element; a square insulator table supported at the vertex of said holding spring by a shaft pin; and a coil contact detachably affixed to said insulator table.

* * * * *